May 9, 1950  F. E. MILLER  2,507,037
TIRE CHAIN
Filed July 19, 1946  2 Sheets-Sheet 1

Inventor
FRED E. MILLER

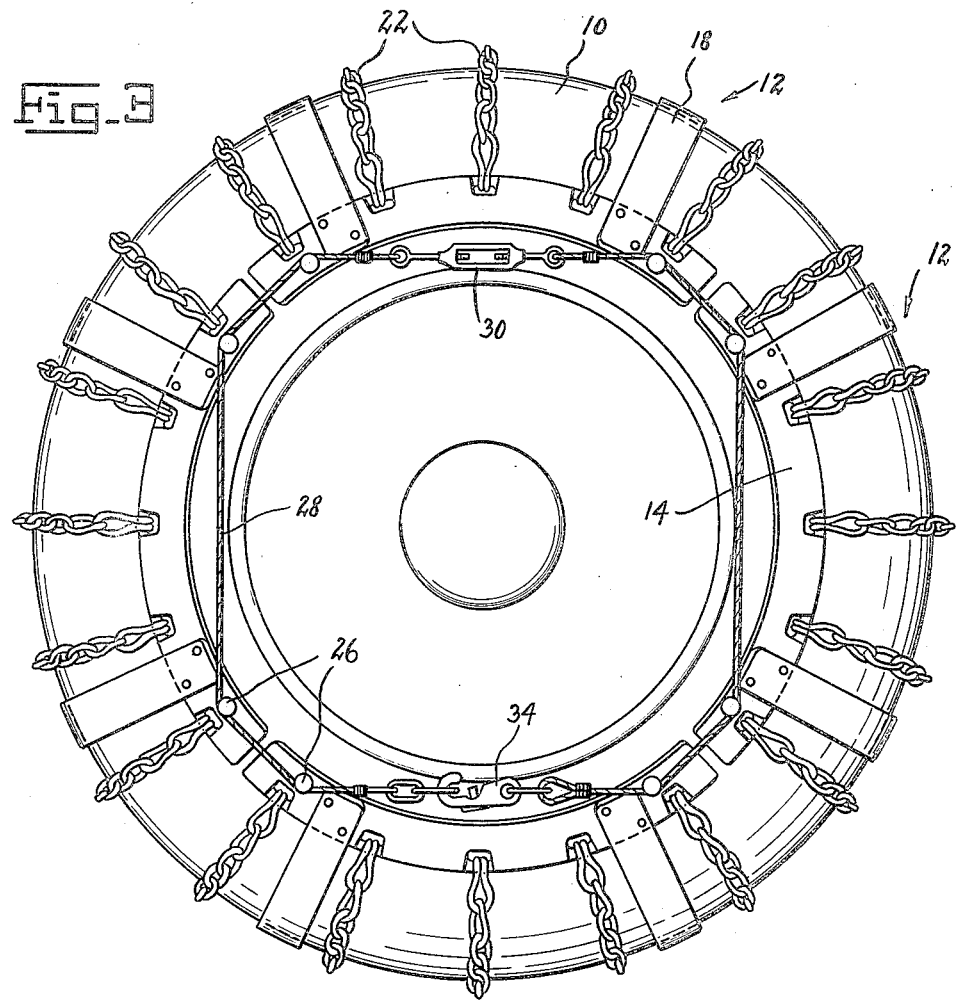

Patented May 9, 1950

2,507,037

UNITED STATES PATENT OFFICE 2,507,037

TIRE CHAIN

Fred E. Miller, Portland, Conn.

Application July 19, 1946, Serial No. 684,931

4 Claims. (Cl. 152—233)

The present invention relates to novel and useful improvements in a tire chain and more specifically pertains to an improved tire chain which may be used as single emergency units, or may be employed as a chain covering the entire periphery of a tire.

The primary object of this invention resides in providing a tire chain having a standard unit which may be employed in multiples of two as desired, together with a novel, efficient, easily applied, and easily adjusted unitary means for securing the units in desired position upon a tire.

An additional object of the invention is to provide a device in conformity with the preceding objects, wherein the emergency chain may be easily and readily attached to the wheels of vehicles without jacking up the same, and under extremely adverse conditions, such as when the vehicle wheel is emersed in snow, mud or the like.

Yet another important object of my invention resides in providing an emergency chain, in conformity with the foregoing objects, wherein an easily applied attaching means is adapted to be secured upon the outer side only of the chain unit.

Still another important object of the invention comprehends the arrangement of a device conforming to the aforementioned objects, wherein an endless chain means is provided for securing the individual units in pairs, in operative position upon a tire, and wherein a quick detachable fastening means is provided for selectively varying the length of the endless means, and wherein a readily adjustable tensioning means is provided for regulating the tension of the chain assembly upon the tire of a vehicle, while permitting the individual cross links to loosely embrace the tread of the tire.

These, together with numerous other objects of the invention which will later become apparent as the following description proceeds, are attained by my device, one embodiment of which has been illustrated, by way of example only, in the accompanying drawings, wherein:

Figure 3 is a side elevational view of a plurality of the units assembled upon a tire in a position to form a complete chain therefor.

Figure 1:
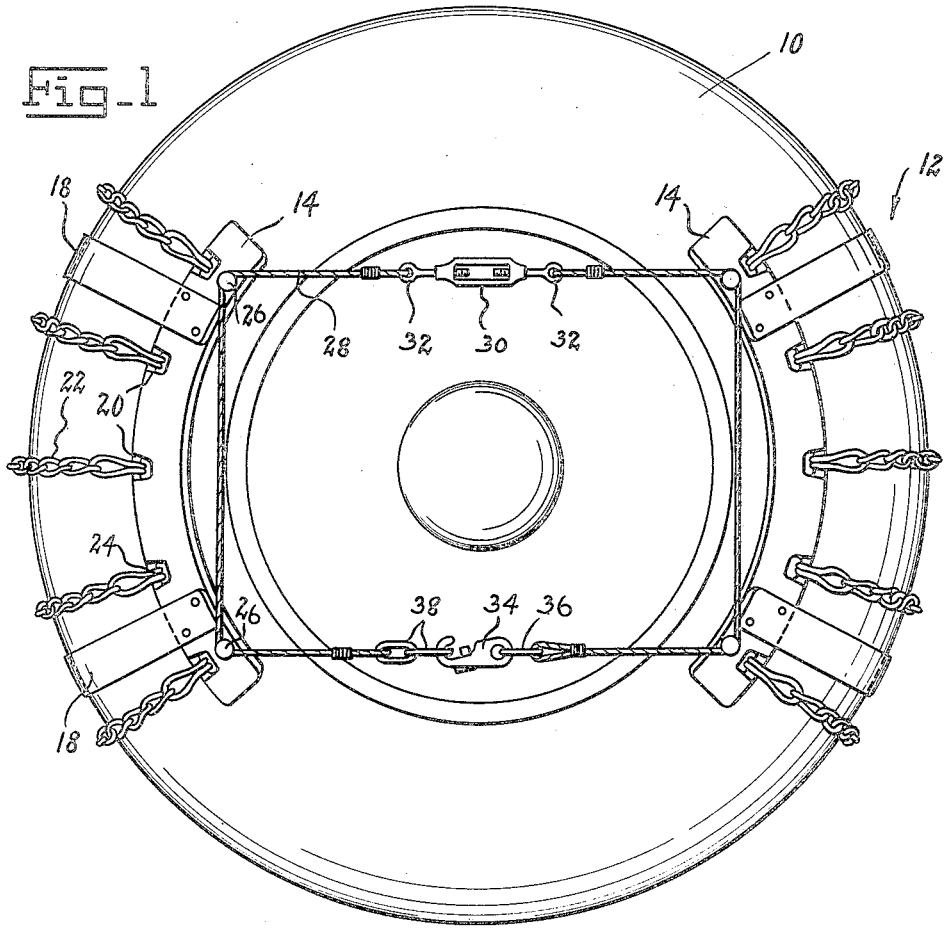
Figure 1 is a side elevational view, showing a pair of emergency chain units applied in position upon a tire.
Figure 2:
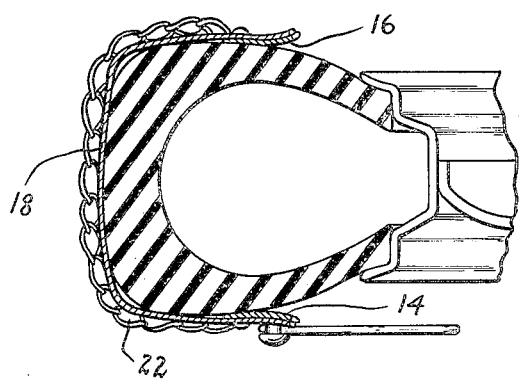
Figure 2 is a cross sectional view through a portion of a tire showing the construction of the invention applied thereto.

In the accompanying drawings, numeral 10 denotes generally a vehicle tire upon which a plurality of units, each indicated at 12, may be applied in conformity with my invention. As shown best in Figures 1 and 2, each unit consists of a pair of arcuate strips, shown at 14 and 16, which are concentric with the bead or rim of the tire 10. As shown, the strip 14 is provided at the outer surface of the wheel while the strip 16 which is parallel thereto, is positioned upon the back side of the wheel. The strips 14 and 16 are connected by a plurality, in this instance two flexible members 18 which are preferably rigidly attached to the strips 14 and 16, and are generally U-shaped in cross section and are adapted to snugly embrace the tread and side walls of a tire. The perimeter of the outwardly disposed strip 14, is provided with a plurality of axially spaced apertures 20 while corresponding apertures are positioned upon the rearwardly placed strip 16. A plurality of cross chains 22 are provided, having hooked end portions 24 which are adapted to detachably engage and be secured to the apertures above mentioned. The length of the cross chains 22 is so chosen that when the strips 14 and 16 are pulled radially inwardly of the wheel, in a manner to be subsequently described, the flexible members 18 will tightly engage the tread of the tire, while the cross chains 22 will freely and loosely embrace the tread. By means of this construction and proportioning of parts, the detrimental defect of the chafing of the tire by too tight cross chains is safely eliminated. At each extremity of the strip 14, and at any other suitable points found desirable, are provided a plurality of headed studs 26 over which is entrained a continuous chain, which may preferably take the form of a cable 28 having a turn buckle 30 attached thereto as by eyes 32. Also connected in the endless cable, is a quickly detachable fastening 34 secured as by a link 36 to a portion of the cable and having its hooked end selectively engaging one of a series of links 38.

From the foregoing, the utility and operation of my invention will be now apparent. When the condition of the vehicle renders the use of an emergency chain desirable, as when stalled in snow, mud or the like, a pair of units 12 is loosely disposed over diametrically opposite portions of the tire, with the strips 14 disposed upon the outward surface of the wheel. The endless chain 28 is then entrained over the stud 26, and tension is applied thereto by the turn buckle 30, whereby the flexible members 18 are caused to tightly grip and embrace the tire tread. As will be evident, the attachment of the single fastening means is easily effected and readily removed when no longer necessary.

As shown in Figure 3, a plurality of units 12 are disposed in diametrically opposed pairs, in sufficient quantity to completely envelop and encase the entire periphery of the wheel. The endless fastening means is then entrained over all of the protruding studs 26, and the single tensioning means 30 is manipulated to properly and evenly tension each of the units whereby the plurality of units will function as a single all-embracing anti-skid means.

Since various modifications of the principles of this invention will be readily apparent to those skilled in the art, I do not wish to limit myself to the exact construction disclosed and described, but may employ any suitable modifications falling within the scope of the appended claims.

I claim as my invention:

1. An emergency chain for vehicle tires comprising a pair of units, each of said units including a pair of arcuate strips curved to conform to the longitudinal curvature of a tire and to fit the side walls adjacent the rim thereof, a pair of bowed flexible members connecting said strips extending between and rigidly secured thereto, said strips and members constituting a cradle, said strips yieldingly embracing a section of the side walls and tread of a tire, said strips being provided with a plurality of pairs of axially spaced apertures, a plurality of cross chains selectively engaging said pairs of apertures and extending across the tire tread, a pair of headed studs extending from one strip of each unit, and a continuous, closed fastening means engageable with said studs to tension said units upon a tire.

2. An emergency chain for vehicle tires comprising a pair of units, each of said units including a pair of arcuate strips curved to conform to the longitudinal curvature of a tire and to fit the side walls adjacent the rim thereof, a pair of flexible bowed members connecting said strips extending between and rigidly secured thereto, said strips and members constituting a cradle, said strips yieldingly embracing a section of the side walls and tread of a tire, said strips being provided with a plurality of pairs of axially spaced apertures, a plurality of cross chains selectively engaging said pairs of apertures and extending across the tire tread, a pair of headed studs extending from one strip of each unit, and a continuous, closed fastening means engageable with said studs to tension said units upon a tire, said means including a slack takeup member for tensioning said means, said cross chains being longer than said flexible members whereby said tensioning means is inoperative to tension said cross chains.

3. The combination of claim 1 wherein said continuous fastening means is applied to the strips of units on the same side of a tire only, the other strips being free to move relative to each other.

4. The combination of claim 2 wherein said continuous fastening means is applied to the strips of units on the same side of a tire only, the other strips of units being free to move relative to each other.

FRED E. MILLER.

REFERENCES CITED

The following references are of record in the file of this patent:

UNITED STATES PATENTS

| Number | Name | Date |
|---|---|---|
| 1,090,605 | Dyer | Mar. 17, 1914 |
| 1,101,198 | Lasher | June 23, 1914 |
| 1,311,048 | Cramer | July 22, 1919 |
| 1,339,963 | Mahan | May 11, 1920 |
| 1,606,148 | Cole | Nov. 9, 1926 |
| 1,733,308 | Lawrence | Oct. 29, 1929 |
| 2,290,398 | Wellington | July 21, 1942 |